United States Patent

[11] 3,554,373

[72] Inventors Ralph W. Rothfusz
Southfield;
Markus H. Ritter, Dearborn Heights, Mich.
[21] Appl. No. 796,845
[22] Filed Feb. 5, 1969
[45] Patented Jan 12, 1971
[73] Assignee The Bendix Corporation
a corporation of Delaware

[54] MAGNETIC DOCUMENT-SHIFTING METHOD AND APPARATUS
10 Claims, 19 Drawing Figs.

[52] U.S. Cl. .... 209/111.8
[51] Int. Cl. .... B07c 5/344
[50] Field of Search .... 209/80.5, 111.8; 201/74.1; 198/41; 271/8

[56] References Cited

UNITED STATES PATENTS

| | | | |
|---|---|---|---|
| 2,922,424 | 1/1960 | Scott | 209/111.8 |
| 3,377,069 | 4/1968 | Nottoli | 209/111.8(X) |
| 3,450,261 | 6/1969 | Kalthoff et al. | 209/80.5 |
| 3,478,877 | 11/1969 | Parry | 209/80.5 |

*Primary Examiner*—Richard A. Schacher
*Assistant Examiner*—Gene A. Church
*Attorney*—Wood, Herron and Evans

ABSTRACT: A magnetic card-shifting device for shifting a card, which has a ferromagnetic chip implanted in an edge thereof, from a first position, wherein the chip is spaced from the shifting device, to a second position displaced from the first position, the distance shifted being in excess of the initial displacement of the shifting device and implanted chip. The shifting device includes an electromagnet positionable adjacent the chip in spaced apart magnetic flux linking relationship therewith at an intermediate point between the first and second positions, and an electromagnet energization circuit for initially energizing the electromagnet with a first relatively high current level signal to exert a large attractive force on the implanted ferromagnetic chip and advance the chip into contact with the electromagnet, thereby simultaneously acquiring the card and advancing it to the intermediate position, and thereafter energizing the electromagnet with a second relatively low current level signal to exert on the ferromagnetic chip of the acquired card in contact with the electromagnet a relatively small force for holding the acquired card fixed relative to the electromagnet, thereby enabling movement of the acquired and fixedly held card from the intermediate position whereat the card is acquired to the second position in response to movement of the electromagnet from the intermediate position to the second position.

PATENTED JAN 12 1971

3,554,373

SHEET 1 OF 3

INVENTORS
Ralph W. Rothfusz
BY Markus H. Ritter
Wood, Herron and Evans
ATTORNEYS INVENTORS
Ralph W. Rothfuss
BY Markus H. Ritter
Wood, Herron and Evans
ATTORNEYS INVENTORS
Ralph W. Rothfusz
BY Markus H. Ritter
Wood, Herron & Evans
ATTORNEYS

MAGNETIC DOCUMENT-SHIFTING METHOD AND APPARATUS

This invention relates to an apparatus and method for shifting documents, and more particularly to magnetic apparatus and methods for shifting cards implanted with ferromagnetic chips which are suitable for use in card retrieval systems of the type wherein cards having code-notched edges are sorted by moving them relative to transverse sorting bars common to the cards.

The improved document-shifting method and apparatus of this invention is suitable for use in any document-handling environment wherein documents having implanted ferromagnetic chips are to be shifted under the influence of a magnet. However, for the purpose of clarity, the invention, while of general document-handling utility, is described in conjunction with a specific type of document-handling system with which the invention exhibits an unusually high degree of utility. Specifically, the invention is described in conjunction with document-handling systems of the type disclosed in the pending applications of Robert J. Kalthoff et al., DATA RETRIEVAL APPARATUS AND METHOD, now U.S. Pat. No. 3,450,261, issued Jun. 17, 1969, and Robert D. Parry, ARTICLE SELECTION SYSTEM, now U.S. Pat. No. 3,478,877 issued Nov. 18, 1969.

In accordance with the Kalthoff et al. document-retrieval system, a plurality of record cards are provided, each having a plurality of contiguous notch sites located along one edge, preferably the upper edge, termed the "sorting edge". Each notch site is susceptive of being binary-coded by providing, or not providing, as the case may be, a single depth shallow notch at the particular notch site. Each card, in addition to having a sorting edge of binary codable notch sites, also includes a first ferromagnetic implant, or chip, mounted along the sorting edge, and a second ferromagnetic chip mounted on the edge of the card opposite the sorting edge.

In a typical installation, a collection of coded cards is placed in random order in a card-supporting tray. In order to sort the cards, they are brought into a sorting position in which the cards are suspended in a vertical plane from a first or upper elongated magnet disposed transversely of the aligned cards adjacent the first ferromagnetic chip located in the upper sorting edge. A second or lower magnet is disposed adjacent the second ferromagnetic chip implanted in the bottom edge of the cards, that is, in the edge of the cards opposite the sorting edge.

In order to retrieve or select a desired card or cards from others which are not desired, one or more of a plurality of parallel selector or sort bars mounted above the cards are positioned in accordance with the code of the desired card to be selected. The selector bars extend across the tray perpendicular to the cards and correspond in number to the number of notch sites in the sorting edge, with one selector bar being disposed over each notch site when the cards are in the sorting position. Initially all of the selector bars are in a retracted or elevated position and are disengaged from the stored cards. The operator, by operating the keys of a console or control board, causes the selector bars corresponding to the code of the desired card or cards to be set or advanced, relative to the remaining bars of the group, toward the aligned sorting edges of the randomly stored cards. For example, if it is desired to select a card having notches in the third and sixth notch sites the third and sixth selector bars are set, that is, projected from the remaining bars toward the aligned sorting edges.

The set selector bars and the upper magnet are then moved relative to each other to bring the selector bars into contact with the upper sorting edges of all the cards. The set selector bars enter the notches of the desired card or cards, which have a code notch pattern conforming to the pattern of set bars, allowing these cards to remain stationary. In the illustrative example given, the set bars enter the third and sixth notches of the desired card. All cards which do not have notch patterns conforming to the pattern of set bars, that is, which do not have notches in both the third and sixth notch sites, are engaged by one or both of the set selector bars, and are rejected by being forced from in contact with the upper magnet. The undesired cards are shifted a sufficient distance so that they are no longer effectively held by the upper magnet, but rather fall under the force of gravity to a point wherein ideally they are in contact with and positively gripped by the second or lower magnet. This initial shifting of the desired cards and undesired cards relative to each other is herein termed "initial separation."

To further separate the desired cards from the undesired cards, the lower magnet which ideally is in contact with the undesired cards but not the desired cards, and the upper magnet which is in contact with the desired cards but not the undesired cards, are moved relative to each other. The exact extent of relative movement of the desired and undesired cards, and hence the exact extent of further separation of desired and undesired cards, depends upon the relative movement of the upper and lower magnets. This additional separation of the desired and undesired cards is herein termed "final or further separation," and is useful to permit easy removal or viewing of the contents of the desired cards.

In the Parry system for selecting edge-notched articles, referenced previously, a plurality of cards are provided each having teeth formed along a sorting edge, preferably the bottom edge, which are selectively removable for coding purposes and spaced from each other by intermediate registration notches. The cards are also provided with a lock notch and removed corner section. The lock notch and removed corner section are positioned along the sorting edge between the group of removable teeth and associated registration notches, and an adjacent transverse card edge herein termed the "trailing edge". The card further includes a ferromagnetic implant or chip mounted in the transverse edge of the card opposite the trailing edge, herein termed the "leading edge".

The cards are randomly stored in face-to-face vertical relation on a horizontal slotted platen with their sorting edges lowermost and transverse to the platen slots. Disposed in the platen slots are a plurality of code or sort bars corresponding in number to, and aligned with, the registration notches formed by the spaces between the code-notchable teeth. The sort bars, which normally are positioned with their upper edges flush with the top surface of the platen, are selectively elevatable to an upper or set position wherein their upper edges protrude above the platen into their respective card registration notches of the stored cards. Located parallel to the sort bars opposite the lock notches of the stored cards is a transversely disposed lock bar which is selectively elevatable to a card lock position wherein the lock bar is susceptive of being positioned in the lock notches of the cards. An elongated magnet is transversely disposed relative to the stored cards opposite and in alignment with the ferromagnetic chips implanted in the leading edge of the cards.

Card selection in the Parry system, like in the Kalthoff et al. system, is effected in two sequential steps, namely, an initial separation step and a further or final separation step. The initial separation is accomplished by elevating or setting the sort bars in a pattern conforming to the removed tooth pattern of the desired card or cards, and thereafter moving the magnet rectilinearly a distance equal to one tooth in a direction parallel to the sorting edge. Ideally the desired cards, that is, the cards having a removed tooth pattern conforming to that of the set sort bars, shift laterally in the direction of their sorting edges a distance equal to the width of one tooth, and in so doing align their removed corner sections in the trailing edge with the lock bar. This movement is possible because the teeth of the desired cards located adjacent the set sort bars are removed. The undesired cards, that is, those cards with a nonconforming removed tooth pattern, are not free to move in a direction parallel to their sort edge, and consequently remain stationary, leaving their trailing edge lock notches aligned with the lock bar. Once initially separated, the desired cards are further separated from the undesired cards by moving the magnet rectilinearly in the same direction an additional distance, the magnitude of which depends on the amount of separation between the selected and unselected cards which is desired.

However, prior to moving the magnet the additional distance necessary to effect further separation of the desired and undesired cards, the lock bar is elevated to engage the lock notches of the unselected cards which have remained stationary and aligned with the lock bar during the initial phase of magnet movement. The elevated lock bar does not engage the lock notches of the desired cards because these cards, in the course of the initial separation phase, shifted laterally relative to the undesired cards a distance sufficient to locate the lock bar in transverse registry with the removed corner sections of the desired cards.

With the lock notches of only the undesired cards engaged by the set lock bar, the sort bars are reset and the magnet moved further in a direction parallel to the sort edge. This further separates the desired cards from the undesired cards which are positively restrained from movement by the lock bar which engages their lock notches. Thus, the lock bar positively prevents, during the final separation step, selection of undesired cards.

While the Parry and Kalthoff et al. systems are markedly different in the sense that, in the former, card separation involves relative movement of the desired and undesired cards in a direction parallel to the sorting edge with positive restraint of undesired cards, while the latter involves card separating movement in a direction normal to the sorting edge with no positive restraint of undesired cards, both systems have one characteristic in common. Namely, each system utilizes an elongated magnet, which is common to the ferromagnetic chips implanted in the cards, to facilitate card movement or shifting during the initial and final separation phases of the complete card sorting cycle. It is this characteristic common to both the Parry and the Kalthoff et al. systems to which the present invention relates. Specifically, the present invention relates to an improvement in the magnetic means utilized to attract, acquire and move the ferromagnetic implant-bearing cards in the course of effecting card separation.

In both the Parry and the Kalthoff et al. document-retrieval systems, it has been found that in the process of shifting the cards with the magnet to facilitate separation of the desired and undesired cards, it is possible for one or more cards, prior to movement of the magnet, to be positioned relative to the magnet such that the ferromagnetic implant is physically displaced or spaced apart from the magnet. This excess spacing is often due to excessive card dimension tolerances or warpage in card-holding mechanism and long magnet. When this occurs, should the displacement between the cards and magnet be sufficient, the attractive forces of the magnet are incapable of advancing the displaced cards toward the magnet to enable the magnet to contact the ferromagnetic chip and thereby acquire the card. Consequently, when the magnet thereafter moves to effect separation of the desired and undesired cards those cards which have not been acquired are not shifted and thereby separated. In the Kalthoff et al. system this condition results in two types of failures, selecting cards which should have remained unselected due to card friction and not selecting cards which should have been selected while in the Parry system cards which should be selected remain unselected.

Specifically, in the Kalthoff et al. system, it is possible for the friction between desired and undesired cards disposed adjacent each other to be large enough to prevent undesired cards rejected by the sorting bars during the initial separation from dropping downwardly a distance sufficient to enable their lower chip to contact the lower magnet. If the displacement, following this initial separation, between the lower chip of an undesired card and the lower magnet is sufficient, the lower magnet fails to attract and acquire the rejected card, and when the lower magnet subsequently moves relative to the upper magnet to further separate the desired and undesired cards, the unacquired but undesired card remains with the desired cards, resulting in an erroneous retrieval.

In the Parry system, if cards, prior to initial separation, are positioned relative to the elongated magnet such that their ferromagnetic chips are displaced therefrom, and if the displacement is sufficient, the magnet fails to attract and initially acquire the displaced cards. Under these conditions, when the magnet moves in a direction parallel to the sorting edge to effect initial separation of the desired and undesired cards, any desired cards which are initially unacquired do not move with the magnet, but remain with the undesired cards. This produces a retrieval error, namely, a failure to retrieve one or more desired cards.

It has been proposed, to insure acquisition of all cards having ferromagnetic chips initially displaced from the magnet, to provide a powerful magnet capable of exerting very large attractive forces on the card chips. However, it has been found that under certain conditions there are disadvantages which render this proposal impractical. For example, in the Parry system if a magnet is provided having a force sufficient to acquire all cards initially displaced therefrom, the "breakaway force," is, the force which must be exerted on the card to remove it from the magnet during the initial separation step, is so large that damage to the teeth of undesired cards during the initial separation phase of the sorting cycle results. Specifically, if the breakaway force is too large, undesired cards having a nonconforming notch pattern, which are normally restrained from lateral movement under the action of the magnet by reason of the engagement of its teeth and the set sorting bars, are laterally shifted, damaging the teeth of the undesired cards.

Additionally, magnets having forces sufficient to acquire all cards under all conditions of chip-magnet displacement frequently are too large and too expensive to be commercially feasible.

It has been an objective of this invention to provide, in a card retrieval system of the general type described previously, magnetic means for acquiring cards having their ferromagnetic chips initially spaced from the magnet, and yet which does not damage the cards or result in a magnet of prohibitive size and/or cost. In accordance with certain principles of this invention, this objective has been accomplished by providing a unique apparatus and method which centers on the utilization of an electromagnet which is first energized with an electrical signal of high level to produce a relatively large attractive force for initially acquiring cards whose chips are spaced from the magnet, and which is subsequently energized with an electrical signal of relatively low level for producing a relatively small attractive force for holding the acquired cards fixed relative to the magnet, thereby enabling movement of the acquired cards in response to movement of the magnet.

With the magnetic means of this invention, a relatively large force necessary to initially acquire displaced cards can be provided with a magnet of relatively low cost and small size. Additionally, since the large force necessary for acquisition is of short duration and not continued throughout the entire card separation cycle, there is no likelihood of damage to the cards by unduly high breakaway forces. Accordingly, when the magnet moves to initially separate cards, for example, in the Parry system described previously, the teeth of undesired cards are not damaged. Finally, because of the bilevel magnet energization approach of this invention wherein the high current signal is applied for a period sufficient only to acquire cards initially displaced from the magnet, there is no likelihood that the electromagnet or electrical insulation on its windings, which for commercial reasons must be relatively small and inexpensive, will become burned-out by sustained high-level currents.

Certain other objects and advantages of this invention will become more readily apparent from the following detailed description of this invention taken in conjunction with the drawings in which:

FIGS. 1A—1D are front elevational views in cross section depicting the relationship of the upper and lower magnets, sorting bars, and encoded cards of the Kalthoff et al. system during different stages of the sorting cycle.

FIGS. 2A—2E are front elevational views in cross section depicting the relationship of the magnet, encoded cards, and sorting and lock bars of the Parry system during different phases of the sorting cycle.

Figure 1A:
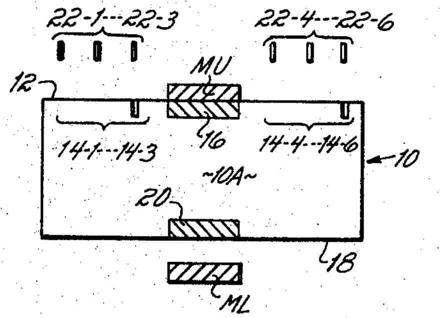

FIGS. 8A—8E are front elevational views in cross section depicting the relationship of the magnet, encoded cards, and sorting and lock bars of the Parry system during different phases of the sorting cycle in which a malfunction is illustrated.

For the purpose of more clearly understanding the significance of this invention and the problem solved thereby, two document retrieval systems with which the invention possesses a high degree of utility are briefly described in conjunction with FIGS. 1A—1D and 2A—2E. Referring to FIGS. 1A—1D, a document-retrieval system of the general type disclosed and claimed in the previously referenced Kalthoff et al. application is depicted. This system includes a plurality of vertically disposed randomly stored cards 10. The cards 10 are suspended from a first or upper transverse magnet MU which contacts an upper ferromagnetic chip 16 implanted in the upper or sorting edge 12. Provided in the sorting edge 12 of each card 10 are a plurality of notch sites 14. Each notch site 14 is susceptive of being coded in binary by selective removal of the notch site, that is, by notching. In the card 10 illustrated in FIG. 1A, six notch sites 14–1 to 14–6 are provided. The notch sites 14–1 to 14–6 are disposed in equal numbers on opposite sides of the upper ferromagnetic chip 16.

A plurality of sort bars 22–1 to 22–6 corresponding in number to the number of notch sites 14–1 to 14–6 are also provided. The sort bars 22–1 to 22–6, which are parallel to the upper magnet MU and aligned with their respective associated notch sites 14–1 to 14–6, are selectively vertically movable to a set position, and when so set, urge undesired cards, that is, cards not having a notch pattern conforming to the pattern of set bars, away from the upper magnet MU to initially separate the desired and undesired cards. Located opposite the chip 16 and implanted in the bottom edge 18 of the card 10 is a second or lower ferromagnetic chip 20. Transversely disposed relative to the cards 10 and in alignment with and spaced slightly below the lower chips 20 is a second or lower magnet ML. The magnet ML effects the final separation between desired and undesired cards when moved downwardly.

Figure 1B:
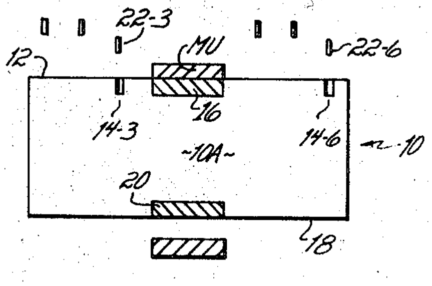

In operation, when a particular card, such as card 10A having notches in the third and sixth notch sites 14–3 and 14–6, respectively, is to be retrieved, the sort bars 22–3 and 22–6 corresponding to the code notches of the desired card are lowered to the set position depicted in FIG. 1B. Thereafter the upper magnet MU, which initially is in contact with all the randomly stored cards 10, is moved from the position shown in FIG. 1B to the position shown in FIG. 1C. Movement of the upper magnet MU to the position shown in FIG. 1C urges all of the cards 10 into contact with the set sort bars 22–3 and 22–6. Those cards 10A having a notch pattern conforming to that of the set bars 22–3 and 22–6 remain in contact with the upper magnet MU, the set bars entering the notches 14–3 and 14–6 thereof. Those cards 10B not having a notch pattern conforming to that of the set bars 22–3 and 22–6 abut the bars and become separated from the upwardly moving magnet MU, effecting the initial separation of the desired and undesired cards.

Figure 1C:
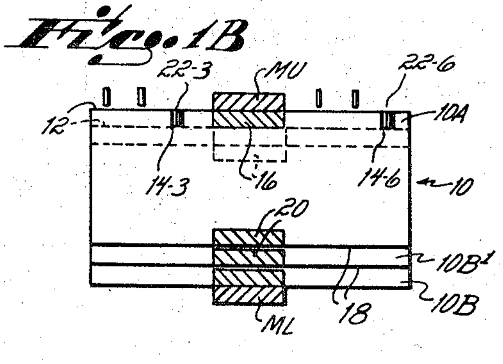
Figure 1D:
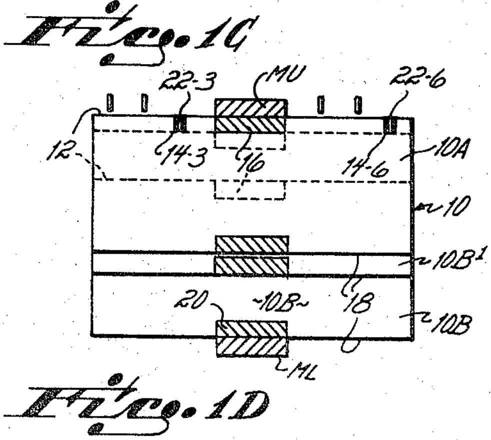

Ideally, the undesired cards 10B fall under the force of gravity to a position wherein their lower chips 20 contact the lower magnet ML as shown in FIG. 1D. However, due to friction between the undesired cards 10B and adjacent desired cards 10A, it is possible that not all the undesired cards 10B drop to the position depicted in FIG. 1D wherein their chips 20 engage the lower magnet ML, but rather drop to an intermediate position wherein their lower chips 20 are spaced from the lower magnet ML as shown by card 10B' in FIG. 1C.

To effect a further and final separation between the desired and undesired cards the lower magnet ML is moved relative to the upper magnet MU, such as by lowering the lower magnet from the position shown in FIG. 1C to the position shown in FIG. 1D. Movement of the lower magnet ML to the position shown in FIG. 1D ideally draws all the undesired cards 10B to the position depicted in FIG. 1D wherein the desired cards 10A and undesired cards 10B are substantially physically displaced.

Should the friction between the undesired cards 10B and adjacent desired cards 10A be sufficient, the distance between the lower magnet ML and the lower chip 20 of the undesired cards after the initial separation step may be sufficient to prevent the lower magnet ML, when it moves from the position shown in FIG. 1C to the position shown in FIG. 1D, from attracting and advancing into contact with the lower magnet ML for movement therewith, an initially spaced apart undesired card, for example, card 10B'. If this occurs, card 10B' is not acquired by the lower magnet ML and when the lower magnet moves to the position depicted in FIG. 1D, the undesired card 10B' remains with the desired cards 10A, producing a retrieval error.

Figure 2A:
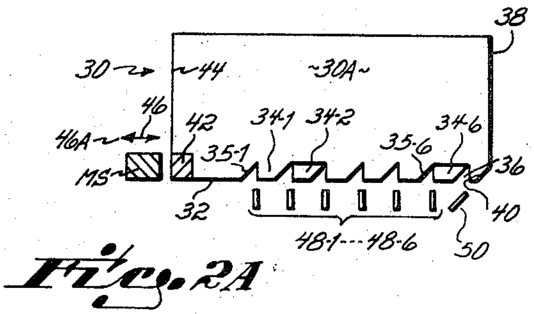
Figure 2B:
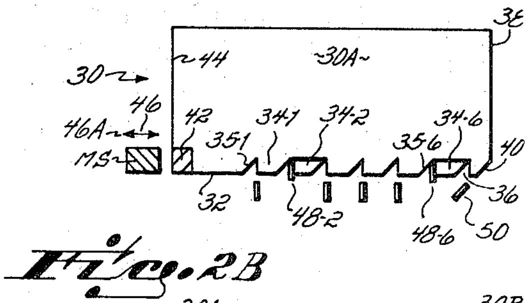

Referring to FIGS. 2A—2E, a document-retrieval system of the general type disclosed in the previously referenced Parry application is depicted. With particular reference to FIG. 2A, a document retrieval system is shown including a plurality of randomly stored cards 30 each having a toothed sorting edge 32, preferably the lower edge thereof, provided with alternate teeth 34–1 to 34–6 and registration notches 35–1 to 35–6. Each of the teeth 34–1 to 34–6 is susceptive of being encoded in binary by selective removal, as by notching, of the respective tooth. The sorting edge 32 further includes a lock notch 36 located between the group of encodable teeth 34 and registration notches 35, and the transverse card edge 38 herein termed the "trailing edge." Adjacent the lock notch 36 is a removed portion 40 of the card located intermediate the lock notch 36 and the trailing edge 38. The card 30 further includes a ferromagnetic chip 42 implanted in the card at the corner of the sorting edge 32 and the transverse edge 44 herein termed the "leading edge."

A side magnet MS disposed transversely of the randomly stored cards 30 opposite the chips 42 is provided. The magnet MS is selectively movable in the direction of arrow 46. Also provided are a plurality of transversely disposed sort bars 48–1 to 48–6 aligned with the registration notches 35–1 to 35–6, and a lock bar 50 aligned with the lock notches 36. Both the sorting bars 48–1 to 48–6 and the lock bar 50 are selectively elevatable to a set position wherein they enter their associated notches 35–1 to 35–6, and 36, respectively, of cards located in the storage position depicted in FIG. 2A.

To select a card or cards 30 having a particular code, for example, a card 30A having teeth 34–2 and 34–6 removed, from among a group of cards 30B not having teeth 34–2 and 34–6 removed, the appropriate sort bars 48 are elevated to the set position. Specifically, sort bars 48–2 and 48–6 corresponding to the removed tooth pattern of the desired card 30A are elevated to the position shown in FIG. 2B. With the sort bars 48–2 and 48–6 in the set position, the desired cards 30A having teeth 34–2 and 34–6 removed can be laterally shifted in the direction 46A of arrow 46 a distance equal to the width of one tooth, to produce an initial separation. However, the undesired cards 30B having tooth 34–2 and/or tooth 34–6 removed are restrained from lateral movement in the direction 46A of arrow 46 by one or both of the set sort bars 48–2 and 48–6, which, in the set position, mechanically interfere with the unremoved teeth 34–2 and 34–6 of the undesired cards 30B.

Figure 2C:
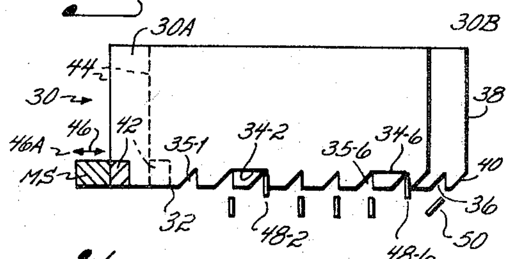

With the sort bars 48–2 and 48–6 conforming to the removed tooth pattern of the desired card 30A in the set position, the magnet MS is shifted in the direction 46A of arrow 46 a distance equal to the width of one tooth of to the position shown in FIG. 2C. Those cards free to shift, namely, the desired cards 30A, ideally move with the magnet MS a distance of one tooth width, effecting an initial separation. Movement of the desired cards 30A in this fashion aligns the removed portion 40 of the desired cards opposite the lock bar 50. The undesired cards 30B do not move in the direction 46A of arrow 46 by reason of the engagement of one or more of their unremoved teeth 34–2 and 34–6 with the set sort bars 46–2 and 46–6, respectively. Consequently, the lock notches 36 of the undesired cards 30B remain aligned with the lock bar 50.

Figures 2D, 2E:
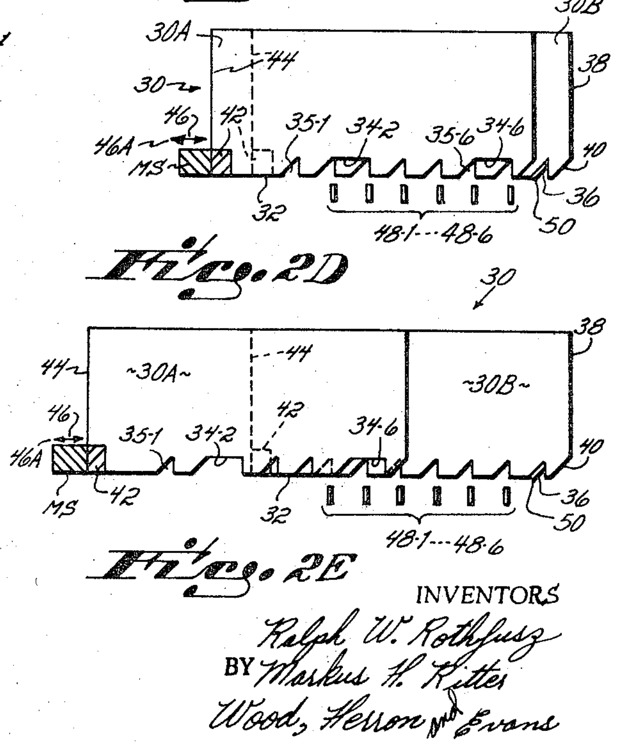

Further separation of the desired cards 30A from the undesired cards 30B is effected by elevating to a set position the lock bar 50, and to an unset position the sort bars 48–2 and 48–6, as shown in FIG. 2E. Setting the lock bar 50 positively prevents the undesired cards 30B from moving in response to continued movement of the magnet MS in the direction 46A of arrow 46. Unsetting the set sort bars 48–2 and 48–6 enables the selected cards 30A to continue movement in the direction 46A of arrow 46 in response to movement of the magnet MS in this direction, the desired cards 30A being free to move this direction by reason of the removed portion 40 thereof being aligned with the lock bar 50. With the lock bar 50 set and the sort bars 48 all in their lower, unset position, the magnet MS is advanced further in the direction 46A of arrow 46, further separating the desired cards 30A from the undesired cards 30B, as shown in FIG. 2E.

Figures 8A, 8B, 8C, 8D, 8E:
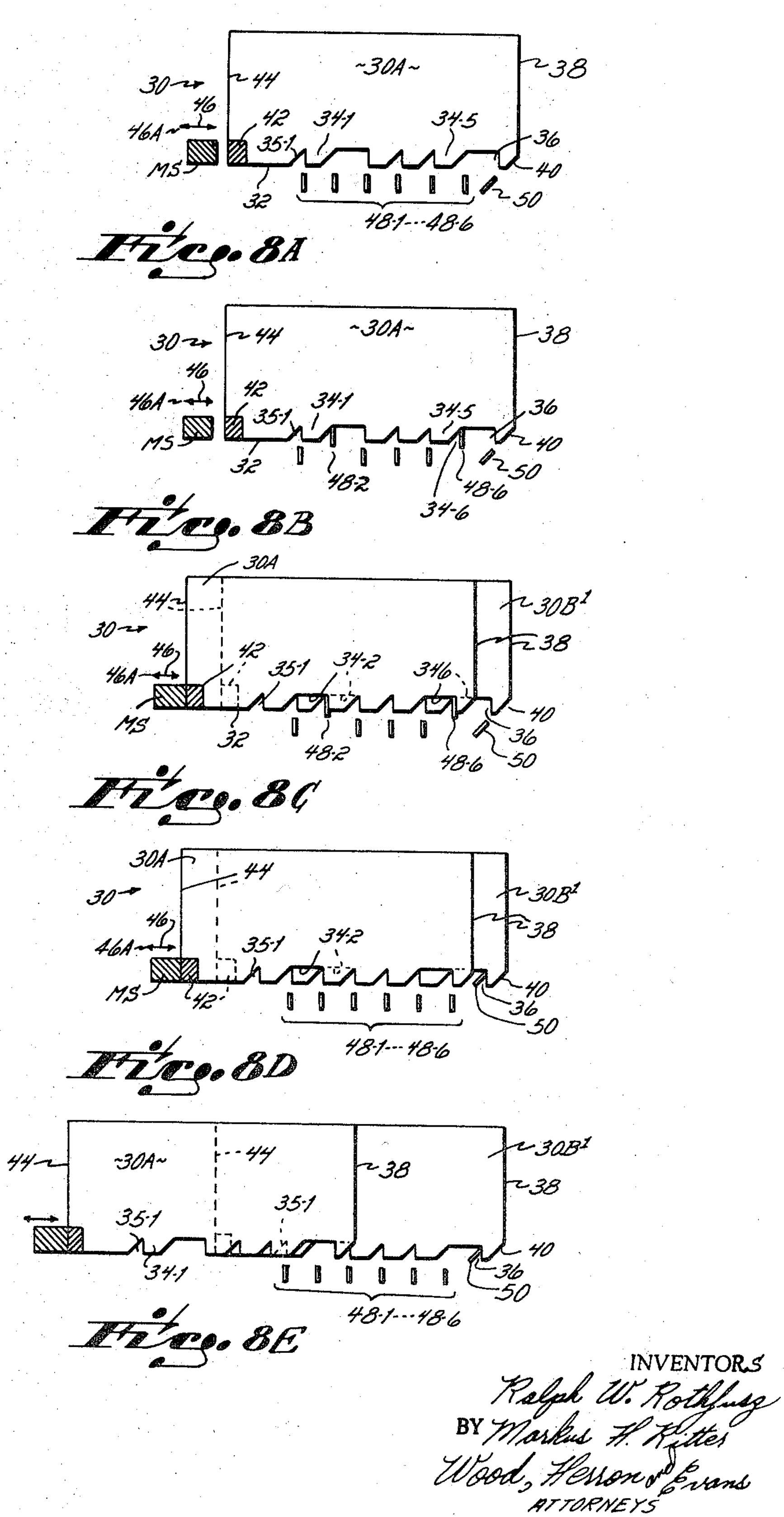

Should the initial displacement between the chip 42 and the magnet MS be sufficiently large prior to movement of the magnet from the position shown in FIG. 8B to the position shown in FIG. 8C to partially separate the desired cards 30A from the undesired cards 30B, it is possible for a desired card which normally moves with the magnet, such as card $30B^1$, to not be acquired by the magnet and as a consequence remain stationary along with the undesired cards. Should this occur, when the magnet MS is moved from the position shown in FIG. 8C to the position shown in FIG. 8E to effect further separation of the desired cards 30A from the undesired cards 30B, the unacquired but desired card $30B^1$ is unselected.

Figure 3:
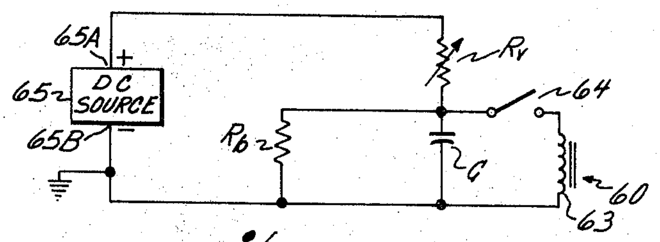
FIG. 3 is a schematic diagram of an electrical circuit suitable for energizing the electromagnet of this invention.
Figure 4:
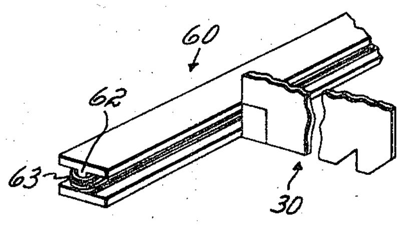
FIG. 4 is a perspective view of a section of the electromagnet of this invention showing the relationship of the electromagnet to a chip-bearing card of the type useful in the Parry system.

Referring to FIG. 3, a preferred embodiment of a magnetic card shifting device is depicted which is capable of acquiring and shifting cards initially positioned with their chips spaced from the magnet. The preferred card-shifting magnetic device includes an electromagnet 60. The electromagnet 60 may constitute the magnet MS depicted in the system of FIG. 2, or the magnet ML depicted in the system of FIG. 1, and in use is disposed transversely of the cards in alignment with the ferromagnetic chip implanted in the stored cards (see FIG. 4) and selectively shiftable toward and away from the chips. The electromagnet 60 is preferably elongated in shape, having a length sufficiently long to accommodate all of the chip-bearing cards stored in the particular retrieval system in which it is used. In a card retrieval system capable of storing 2,000 cards, an electromagnet 60 having a length of 30 inches is suitable. Additionally, the electromagnet 60 has an H-shaped cross section preferably measuring one inch high by one-half inch wide, as depicted in FIG. 4. Wound on the horizontal leg 62 of the electromagnet 60 is a winding 63, preferably having 170 turns of No. 22 wire.

The magnetic card-shifting device further includes a capacitor C which is connected, via a variable resistor $Rv$, across the terminals 65A and 65B of a source of direct current 65 having the polarity shown. The DC source 65, in combination with the resistor $Rv$, establishes a charging circuit for the capacitor C. Preferably the source 65 includes a conventional source of 120 volt AC current, and a diode (not shown) in series with the resistor $Rv$ and poled to provide the source output polarity shown. With the preferred source 65, the capacitor C charges through the resistor $Rv$ to the peak AC voltage of approximately 160 V. A normally open switch 64 is connected between the junction of the resistor $Rv$ and capacitor C and the ungrounded side of the electromagnet 60 to provide a selectively operable discharge path for the capacitor through the electromagnet. A resistor $Rb$ connected in parallel with the capacitor C is provided to slowly bleed charge from the capacitor C. This discharges the capacitor C when the power supply 65 is deenergized. Preferably, resistor $Rb$ has a resistance of 2,000 ohms; resistor $Rv$ a nominal resistance of 100 ohms; and capacitor C a capacitance of 1,400 microfarads.

In operation, when the DC source 65 is energized, capacitor C charges through the resistor $Rv$ to the peak voltage of the source. With reference to the plot of FIG. 5 of instantaneous voltage $e_c$ across the capacitor C versus time, if the source 65 is energized at time $t_o$, the capacitor C charges to the maximum source voltage $E_m$ at time $t_1$. Since the switch 64 is open, no current $i_m$ flows through the electromagnet 60 during the interval $t_o - t_1$, as reflected in the plot of instantaneous electromagnet current $i_m$ versus time, depicted in FIG. 6.

Figure 5:
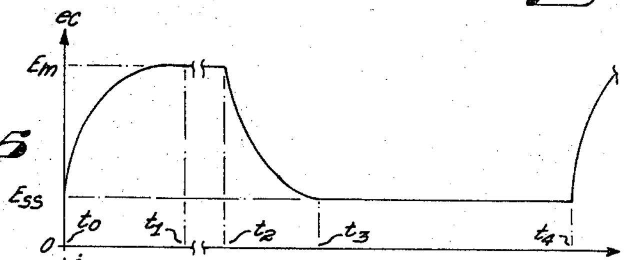
FIGS. 5 and 6 depict plots of the capacitor's voltage and the electromagnet's current vs. time, respectively.
Figure 6:
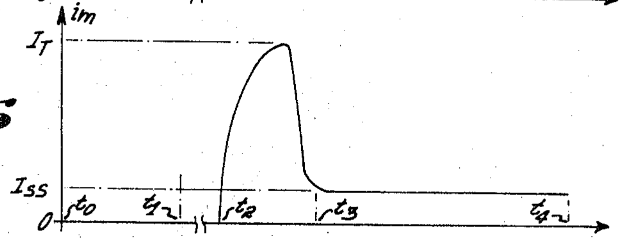

To apply a high-level current signal to the electromagnet 60 for producing the relatively high force necessary to acquire cards initially having their chips displaced from the electromagnet, the switch 64 is closed. Closing of the switch 64 completes a discharge path for capacitor C through the electromagnet 60, causing the capacitor to discharge through the electromagnet. Discharge of the capacitor C provides, for a short interval, a relatively high current level signal through the electromagnet 60, thereby producing the high force necessary to acquire cards whose chips are initially displaced from the electromagnet. With reference to FIGS. 5 and 6, assuming the switch 64 is closed at time $t_2$, the voltage $e_c$ across the capacitor C drops from the maximum value $E_m$ to a steady state value $E_{ss}$ in the approximate interval $t_2 - t_3$. During the interval $t_2 - t_3$ a current signal of relatively large value $I_t$ is input to the electromagnet 60. The value $I_t$ of current through the electromagnet 60 is sufficient in magnitude and duration to acquire all cards whose chips are initially spaced from the electromagnet.

At time $t_3$ when the capacitor voltage $e_c$ has dropped to the steady state value $E_{ss}$, the current $i_m$ through the electromagnet 60 has dropped to a relatively low steady state value $I_{ss}$. The steady state value $I_{ss}$ of the electromagnet current $i_m$ is sufficient to hold fixed relative to the magnet all cards whose chips are in contact therewith, enabling cards so held to be moved in response to movement of the magnet to effect initial and/or final card separation. The period, starting at time $t_3$ and ending at time $t_4$, for which electromagnet 60 is energized by the low-level current signal $I_{ss}$ is determined by the interval of time during which the switch 64 is closed, and is at least coextensive with the duration of movement of the electromagnet.

The steady state voltage and current values $E_{ss}$ and $I_{ss}$, respectively, are dependent upon the values of the resistor $Rv$ and the internal resistance of the electromagnet 60, and can be varied by altering the value of the resistor $Rv$. Increasing the resistance of the resistor $Rv$ decreases the steady state values of both the voltage $E_{ss}$ and the current $I_{s}$ In practice, when the electromagnet 60 is used as the magnet MS in the Parry-type retrieval system depicted in FIG. 2, the following operating specifications have been found satisfactory:

$E_m = 160$ volts.
$E_{ss} = 40$ volts.
$I_t = 10$ amperes.
$I_{ss} = 1$ ampere.
$t_2 - t_3 = .025$ seconds.
$t_3 - t_4 = 3$ seconds.

Figure 7:
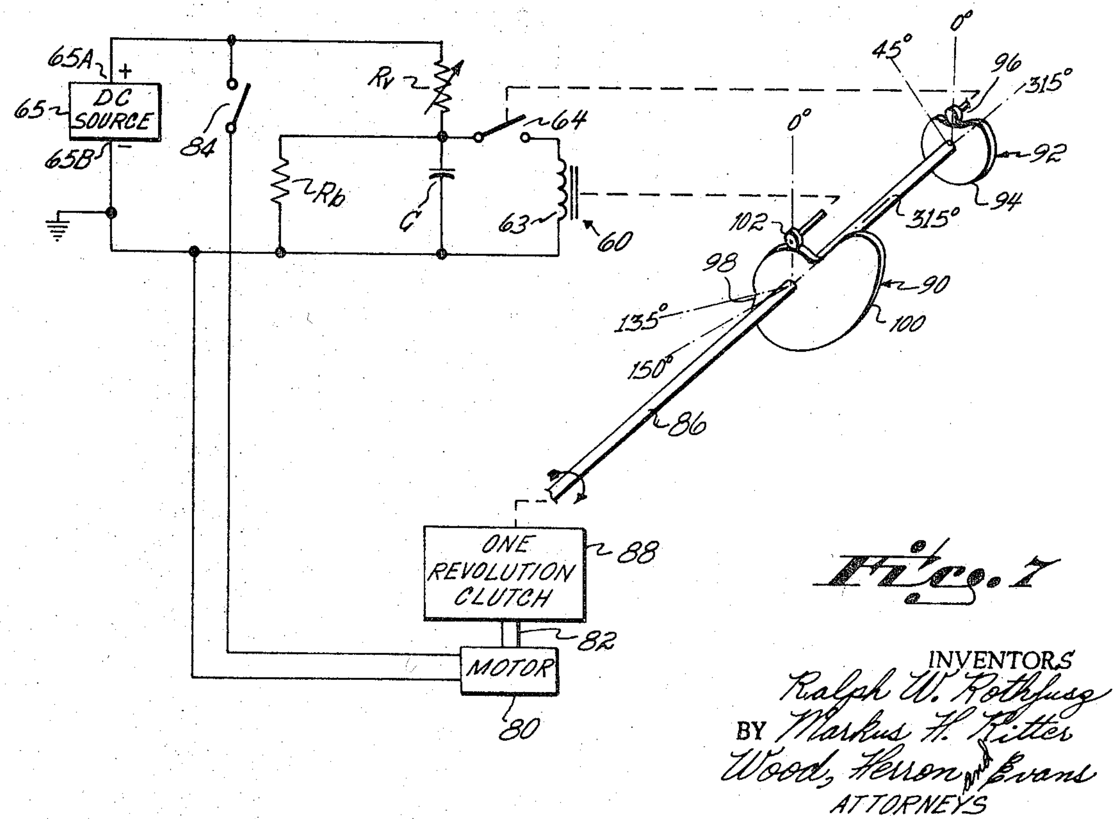
FIG. 7 is a schematic diagram of an electrical and mechanical system suitable for controlling the energization and movement of the electromagnet during a sorting cycle in the Parry system.

With reference to FIG. 7, a simplified electrical and mechanical circuit diagram is shown for controlling the energization of the electromagnet 60 when utilized as a substitute for the magnet MS in the Parry system depicted in FIG. 2. Indentical reference numerals have been utilized in FIGS. 3 and 7 to identify identical circuit elements. The circuit of FIG. 7 includes a DC electric motor 80 adapted to be energized by the DC source 65 in response to closure of a switch 84. The motor 80 has an output shaft 82 which rotates in the direction shown when the switch 84 is closed, and the source 65 is connected to the motor. The motor shaft 82 drives, through a combined gear reduction train and 1-revolution clutch 88, a cam shaft 86 having fixed thereto an electromagnet control cam 90 and a switch control cam 92. The combined gear reduction train and 1-revolution clutch 88 may be of any suitable design adapted to limit the rotation of the cam shaft 86 to a single revolution starting at time $t_2$ and terminating at time $t_4$ in response to closure of the switch 84 for a period of time exceeding the interval $t_2$—$t_4$.

The switch cam 92 has a lobe 94 which cooperates with a cam follower wheel 96 coupled to switch 64, and functions to close the switch 64 when the shaft 86 has rotated through an angle of approximately 45° and maintain the switch 64 closed until the shaft 86 has rotated through an angle of approximately 315°. The cam 90 has two lobes 98 and 100 which cooperate with a cam follower wheel 102 coupled to the electromagnet 60 and function to sequentially advance the magnet 60 in two separate increments in a direction away from the card chips with which it is associated in use. Specifically, cam lobe 98 functions to first move the electromagnet 60 a distance equivalent to that necessary to initially separate the desired and undesired cards, and cam lobe 100 functions to thereafter move the electromagnet a substantial distance, the exact magnitude of which depends upon the final separation of desired and undesired cards required.

In practice, the cam lobe 98 is positioned such that it initially engages the follower 102 to initiate advancement of the magnet 60 a distance sufficient to effect an initial separation of the desired and undesired cards at approximately the 135° point of rotation of the cam shaft 86, and terminates engagement with follower 102 at approximately the 150° point. The cam lobe 100 is positioned such that it initially engages follower 102 to initiate movement of the magnet 60 the required distance for further separation of the desired and undesired cards at approximately the 150° point, and terminates engagement with the follower 102 at approximately the 315° point of rotation of the cam shaft 86.

In operation, assuming the circuit of FIG. 7 is used in conjunction with the Parry system of FIG. 2, a retrieval cycle is initiated by closing the switch 84 after having set the sort bars 48 corresponding to the removed tooth pattern of the desired card. Upon closure of the switch 84, the motor 80 is energized initiating rotation of the cam shaft 86 for one revolution. When the shaft 86 reaches the 45° point, which corresponds to time $t_2$ of FIGS. 5 and 6, cam lobe 94 of cam 92 engages the follower 96 closing the switch 64. Closure of the switch 64 is effective to complete a discharge path for the capacitor C through the electromagnet 60. The capacitor C, which has charged to its maximum voltage $E_m$ upon energization of the DC source 65, discharges through the electromagnet 60, producing a high-level current having a magnitude $I_t$ for a duration $t_2$—$t_3$ which is sufficient to cause the magnet 60 to acquire cards having their chips initially displaced from the electromagnet, that is, to shift cards initially displaced from the electromagnet toward the electromagnet to place the chips and electromagnet in contact. At time $t_3$, which occurs after the cards have been acquired, the current signal $i_m$ to the electromagnet 60 drops to the steady state level $I_{ss}$ which is sufficient to enable the electromagnet 60 to hold and move, during the initial and final card separating phases, all acquired cards unrestrained by the set sort bars.

When the cam shaft 86 rotates to the 135° point, which occurs after time $t_3$, the cam lobe 98 of cam 90 moves the electromagnet 60 in the direction 46A of arrow 46 (FIG. 2) a distance equal to the width of one tooth 34, advancing the desired cards from the position shown in FIG. 2C to the position shown in FIG. 2D, effectively initially separating the desired cards from the undesired cards Rotation of the shaft 86 beyond the 150° point engages the cam lobe 100 with the follower 102 moving the electromagnet 60 from the position shown in FIG. 2D to the position shown in FIG. 2E, producing further and substantial separation between the desired and undesired cards indicative of the final separation phase of the sorting cycle. Cam lobe 100 disengages follower 102 at approximately 315° of rotation of cam shaft 86. During the interval of engagement of the lobes 98 and 100 and the follower 102, the switch 64 is maintained closed by the cam lobe 94, insuring continued energization of the magnet 60 with the low current signal $I_{ss}$ providing the force necessary to hold, in contact with the electromagnet, the desired cards through the initial and final separation phases of the sorting cycle. Switch 64 is opened at time $t_4$ when cam 92 arrives at the 315° point of rotation of shaft 86, terminating energization of the electromagnet 60.

Suitable means (not shown) reset the set sort bars 48 and set the lock bar 50 during the interval between the completion of the initial movement of the magnet through the distance of one tooth width necessary to effect the initial separation of the desired and undesired cards, and the initiation of the final movement of the magnet through the substantial distance necessary to effect the final separation of the desired and undesired cards. Means for resetting the set sort bars and setting the lock bar of the general type disclosed in the previously reference Parry application may be utilized.

I claim:

1. An information retrieval system including a plurality of aligned cards each having a ferromagnetic chip implanted in an edge thereof and a code-notched sorting edge adapted to cooperate with transversely disposed selectively movable sorting bars, the improvement comprising:

an electromagnet positionable transversely of said cards in spaced apart magnetic flux linking relationship to said card edge implanted ferromagnetic chips; and an electromagnet energization circuit electrically connected to said electromagnet including sequentially operable;

a. means for electrically energizing said electromagnet with a first current signal to exert on said implanted ferromagnetic chips for a predetermined interval, a first force to advance, toward said electromagnet, cards having chips initially spaced from said electromagnet; and b. means for energizing said electromagnet with a second current signal of lesser magnitude than said first current signal to exert on said implanted ferromagnetic chip a second force of lesser magnitude and greater duration than said first force for holding said advanced cards fixed relative to said electromagnet to enable movement of said advanced and held cards in response to movement of said electromagnet.

2. The improvement os claim 1 wherein the ratio of the magnitudes of said first and second forces is approximately 10.

3. The improvement of claim 2 wherein the ratio of the magnitudes of said first and second current signals is approximately 10.

4. The improvement of claim 1 wherein said first current signal energizing means includes a capacitor connected to selectively discharge through said electromagnet thereby energizing said electromagnet with said first current signal to advance said initially displaced cards.

5. The improvement of claim 1 wherein said first current signal energizing means includes:

a. a source of unidirectional current;

b. a capacitor connected in charging circuit arrangement with said source; and c. a selectively operable switch interconnecting said capacitor and said said electromagnet for selectively discharging said capacitor through said electromagnet and thereby energizing said electromagnet with said first current signal to advance said initially displaced cards.

6. The improvement of claim 5 wherein said second current signal-energizing means further includes a resistor connected between said source and said electromagnet to limit the steady state current flow from said source through said electromagnet to a magnitude less than the magnitude of said first current signal.

7. In an information retrieval system including a plurality of aligned cards each having a ferromagnetic chip implanted in an edge thereof and a code-notched sorting edge adapted to cooperate with transversely disposed selectively movable sorting bars, the improvement comprising:

an electromagnet positionable transversely of said cards in spaced apart magnetic flux linking relationship to said card edge implanted ferromagnetic chips; and an energization circuit electrically connected to said electromagnet for sequentially energizing said magnet with high and low magnitude current signals for advancing toward said electromagnet cards initially displaced therefrom, and holding fixed relative to said electromagnet said advanced cards as said electromagnet moves, respectively.

8. The improvement of claim 1 wherein the magnitude of said second force is insufficient to move a card positioned in said spaced apart relation to said electromagnet.

9. A method of moving a card having a ferromagnetic chip implanted in an edge thereof from a first position wherein said card is initially separated from an electromagnet to a second position displaced from said first position by a distance exceeding the initial separation of said card and electromagnet, said method comprising the steps of:

establishing a large magnetic attractive force of short duration between said electromagnet and said initially separated card to advance said initially separated card toward said electromagnet; and simultaneously thereafter for a long duration establishing a small magnetic force between said advanced card and said electromagnet and moving said electromagnet from said first position to said second position.

10. A method of moving a card having a ferromagnetic chip implanted in an edge thereof between first and second positions comprising the steps of:

positioning an electromagnet intermediate said first and second positions in space-apart relation to said implanted chip of said card positioned at said first position;

establishing a large magnetic attractive force between said chip and said electromagnet while said electromagnet is held stationary at said intermediate position to advance said chip into contact with said electromagnet, thereby moving said card to said intermediate position;

establishing a small magnetic attractive force between said advanced chip of said card and said electromagnet to hold said chip and electromagnet fixed relative to each other; and moving said electromagnet from said intermediate position to said second position while said small magnetic attractive force is established.